(12) United States Patent
Wilmers et al.

(10) Patent No.: US 12,723,384 B2
(45) Date of Patent: Sep. 1, 2026

(54) MOTION INTERRUPTING WATER-SAVING FAUCET VALVE

(71) Applicants: Wesley Andrew Wilmers, San Diego, CA (US); Dalton Wesley Wilmers, San Diego, CA (US); Connor Grayson Wilmers, San Diego, CA (US); Dale Allen Camper, San Diego, CA (US)

(72) Inventors: Wesley Andrew Wilmers, San Diego, CA (US); Dalton Wesley Wilmers, San Diego, CA (US); Connor Grayson Wilmers, San Diego, CA (US); Dale Allen Camper, San Diego, CA (US)

(73) Assignee: SENSE-ABLE FAUCET, LLC, San Diego, CA (US)

( * ) Notice: Subject to any disclaimer, the term of this patent is extended or adjusted under 35 U.S.C. 154(b) by 0 days.

(21) Appl. No.: 18/614,550

(22) Filed: Mar. 22, 2024

(65) Prior Publication Data

US 2025/0019944 A1 Jan. 16, 2025

Related U.S. Application Data

(60) Provisional application No. 63/454,023, filed on Mar. 22, 2023.

(51) Int. Cl.

*E03C 1/04* (2006.01)
*E03C 1/02* (2006.01)
*F16K 31/60* (2006.01)

(52) U.S. Cl.

CPC .......... *E03C 1/0404* (2013.01); *F16K 31/605* (2013.01); *E03C 2001/026* (2013.01); *Y10T 137/9464* (2015.04)

(58) Field of Classification Search

CPC ............. E03C 1/0404; E03C 2001/026; F16K 31/605; Y10T 137/9464
USPC .......................................................... 137/801
See application file for complete search history.

(56) References Cited

U.S. PATENT DOCUMENTS 2,639,116 A 5/1953 Green
3,476,148 A 11/1969 McMillan
3,642,249 A * 2/1972 Cruse ........................ F16K 3/26 251/344
3,828,821 A 8/1974 Dotter
3,995,664 A 12/1976 Nelson
4,130,136 A 12/1978 Garnier et al.
4,475,570 A 10/1984 Pike et al.
4,548,224 A 10/1985 McLaughlin
4,827,538 A 5/1989 Heimann et al.
(Continued)

*Primary Examiner* — Daphne M Barry
(74) *Attorney, Agent, or Firm* — Gary L. Eastman, Esq.; Eastman IP

(57) ABSTRACT

A motion interrupting water saving faucet valve helps users improve their water efficiency. This is achieved through the use of a soft stop that limits the flow rate of water through a faucet by interrupting the motion of the valve that controls the fluid flow. As a result, there will be multiple different flow rates a user can achieve depending on the needs of a given application. A lower flow rate is the result of the soft stop being engaged through the use of a detent mechanism. The higher rate is the maximum flow rate of a faucet and is easily achieved by a user overriding the soft stop. These different flow rates allow a user to reduce their water consumption because they can now choose between using half or full flow through any given faucet.

14 Claims, 5 Drawing Sheets

(56) References Cited

U.S. PATENT DOCUMENTS 4,942,902 A 7/1990 Knapp
4,957,135 A 9/1990 Knapp
5,095,554 A 3/1992 Gloor
5,095,934 A 3/1992 Iqbal
5,129,416 A 7/1992 Ackroyd
5,226,453 A 7/1993 Biggers et al.
5,315,859 A 5/1994 Schommer
5,363,880 A * 11/1994 Hsieh .................... F16K 31/605 251/105
5,375,624 A 12/1994 Knapp
5,417,242 A 5/1995 Goncze
5,494,076 A 2/1996 Knapp
5,494,077 A * 2/1996 Enoki ................ G05D 23/1353 251/288
5,575,424 A 11/1996 Fleischmann
5,592,971 A 1/1997 Knapp
5,613,521 A 3/1997 Knapp
5,615,709 A 4/1997 Knapp
5,664,603 A 9/1997 Knapp
5,701,926 A 12/1997 Luisi
5,740,836 A 4/1998 Tang
5,813,435 A 9/1998 Knapp
5,829,468 A 11/1998 Watanabe et al.
5,927,333 A 7/1999 Grassberger
5,931,374 A 8/1999 Knapp
5,960,490 A 10/1999 Pitsch
5,979,489 A 11/1999 Pitsch
6,023,796 A 2/2000 Pitsch
6,062,251 A 5/2000 Pitsch
6,135,151 A 10/2000 Bowers et al.
6,363,969 B1 4/2002 Schneider
6,394,133 B1 5/2002 Knapp
6,408,881 B2 6/2002 Lorenzelli et al.
6,517,006 B1 2/2003 Knapp
6,808,130 B1 10/2004 Ouyoung
6,981,692 B2 1/2006 Hong
7,753,074 B2 7/2010 Rosko et al.
7,980,268 B2 7/2011 Rosko et al.
8,109,292 B2 * 2/2012 Bolgar ................ F16K 11/0787 137/625.17
8,347,905 B1 * 1/2013 Stirtz ...................... F16K 35/04 137/636.3
8,578,966 B2 11/2013 Thomas et al.
8,671,984 B2 3/2014 Rosko et al.
9,103,102 B1 8/2015 Prabhakar et al.
9,328,489 B2 5/2016 Prabhakar et al.
2001/0011560 A1 8/2001 Pawelzik et al.
2003/0010721 A1 1/2003 Aldred et al.
2003/0102256 A1 6/2003 Takagi
2004/0010848 A1 1/2004 Esche
2004/0069358 A1 4/2004 Knapp
2004/0094213 A1 5/2004 Knapp
2004/0182459 A1 9/2004 Klein
2004/0221899 A1 11/2004 Parsons et al.
2005/0005977 A1 1/2005 Bolgar et al.
2006/0070668 A1 4/2006 Vu
2007/0131288 A1 6/2007 Moldthan
2008/0110512 A1 5/2008 Giagni et al.
2008/0277927 A1 11/2008 Mueller et al.
2009/0001310 A1 1/2009 Hanson
2009/0025809 A1 1/2009 Oh
2009/0090414 A1 4/2009 Di Nunzio
2009/0189108 A1 7/2009 Ritter et al.
2009/0242058 A1 10/2009 Hansen
2010/0043898 A1 2/2010 Eckhaus
2010/0117017 A1 * 5/2010 Freyre ..................... F16K 35/06 251/285
2010/0155505 A1 6/2010 Lopp et al.
2010/0252115 A1 10/2010 Bassols
2011/0088784 A1 4/2011 Meehan et al.
2011/0100491 A1 5/2011 Zhirkevich
2011/0308652 A1 12/2011 Rosko et al.
2014/0215709 A1 8/2014 Nightlinger et al.
2014/0261749 A1 9/2014 Chen
2015/0211646 A1 7/2015 Kemp et al.
2015/0247587 A1 9/2015 Ben-Dor
2017/0363216 A1 12/2017 Schmitt et al.
2020/0326076 A1 10/2020 Kaufman
2022/0146002 A1 * 5/2022 Banks ................. F16K 11/0782

* cited by examiner

MOTION INTERRUPTING WATER-SAVING FAUCET VALVE

RELATED APPLICATIONS

This application claims priority to U.S. Provisional Patent Application Ser. No. 63/454,023 for a "Motion-Interrupting Water Saving Faucet," filed Mar. 22, 2023, the entirety of which is incorporated herein by reference.

FIELD OF THE INVENTION

The present invention is a motion interrupting water saving faucet valve that improves the water efficiency of a faucet or other plumbing fixtures. The faucet valve itself has a feedback point built into it that allows a user to limit the flow rate through the faucet. However, the function of the feedback point allows a user to easily switch between high or low flow depending on the needs of a given task.

BACKGROUND OF THE INVENTION

In the United States, there has been tremendous effort made to improve water efficiencies of various plumbing fixtures. Some notable efforts include the United States Energy Policy Act of 1992, which mandated the first maximum water efficiencies for plumbing fixtures in both residential and commercial buildings; and in 2016 the California energy commission approved new maximum flow rates for plumbing fixtures in response to the historic drought the state was dealing with at the time. It is estimated that these regulations, including others not named here, combine to save about seven billion gallons of water a day, which is enough to meet the water needs of seven cities that are of similar size to New York City.

Despite these massive improvements, there is still a significant amount of water that can be saved. There are scenarios when a faucet is in use and a user does not need the maximum flow rate. For example, if the flow rate of a faucet in a shower is 1.8 GPM and a user has an option to halve that flow rate, then over the course of a ten-minute shower that user will be able to save roughly twelve gallons of water per shower. If you expand those savings to include at least one shower a day over the course of a seven-day week, the amount of water saved jumps to ninety-four gallons. That savings will add up and greatly aid in water conservation efforts.

Therefore, there is a need in the art for a faucet valve that employs the use of a soft stop to let a user easily reduce their water consumption, is easily used, and comparatively cost effective.

SUMMARY OF THE INVENTION

The present invention is a motion interrupting water saving faucet valve that operates to add an intermediate stop point to provide a natural point in the operation of the valve in which the valve is not fully open in order to prevent the complete opening of the valve and thus impede the flow of water. The impediment results in a lower flow rate from the faucet to assist a user in reducing their water consumption. In a preferred embodiment, when a user turns a faucet on, they will feel the handle hit a "feedback point." This feedback point was designed so that it can be either a hard stop or a soft stop, so that the faucet delivers water at a lower flow rate then what it was designed for. Regardless, in either scenario it is easy for a user to override. If a user wants a higher rate of flow, then they will continue to engage the faucet handle until it turns past the feedback point. Further, if a user initially needs the full flow, but decides that they no longer need it then they can simply turn the valve back to the point where the feedback point is engaged. This is a process that can be repeated as many times as needed for any given task.

Generally speaking, the motion interrupting water saving faucet valve operates through the use of a valve body that has an actuator element and a detent mechanism. The actuator element itself has a speedbump installed onto it and is joined to a faucet handle through a linkage unit. When a user turns the faucet handle, the actuator element is moved until the speedbump hits the detent mechanism; otherwise known as the feedback point.

There are a handful of different embodiments currently disclosed in this application. The first is a lever actuated faucet that has the motion interrupting water saving faucet installed. In this embodiment a user will lift the lever handle until the feedback point is hit, which allows a user to consider the current flow rate. If more is needed, then a user can easily move the lever handle to the fully open position. The second embodiment is a quarter turn faucet valve that has the motion interrupting water saving faucet installed. As a user turns the handle towards the open position, they will eventually hit the feedback mechanism. However, if more fluid flow is desired, then a user can easily turn the handle to overcome the feedback mechanism, to the fully open position. In both embodiments, if a user initially requires the full flow, but realizes later on that a reduce flow will work, then they can easily move the handle to the feedback point.

The motion interrupting water saving faucet valve disclosed herein is a cost effective and simple solution to helping users greatly reduce their water footprint. Additionally, the present invention can easily be installed into existing fixtures, or be seamlessly integrated into faucets that are currently being produced by manufacturers.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE INVENTION

Figure 1B:
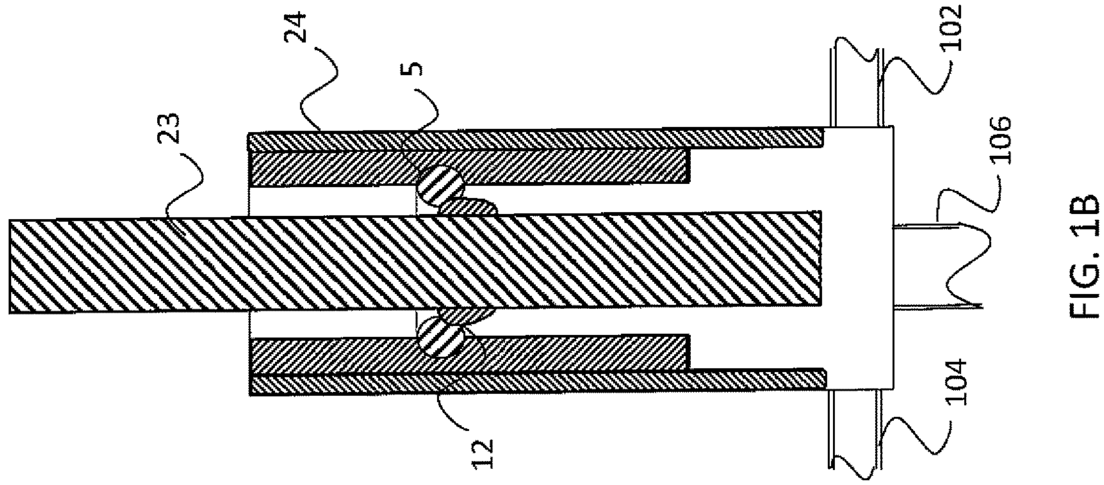
FIG. 1A-1D is a section view of a non-limiting example that illustrates the basic concept behind the motion interrupting water saving faucet valve.

The present invention disclosed is a motion interrupting water saving faucet valve that reduces the water consumption for various different types of faucets. It does so by having a motion interrupting mechanism installed that provides a physical interrupt in the faucet at a predetermined location to prevent the simple wide-open use of the faucet valve. When a faucet is turned on and opened until reaching the physical interrupt and the user is satisfied with the lower flow of water, then no more action is needed; however, if more flow is desired then, the user can easily overcome the motion interrupting mechanism by opening the faucet to the fully open position, and vice versa. Finally, the present invention can be easily installed onto existing plumbing systems, and provides an affordable solution to lowering the water footprint of a user.

Referring initially to FIGS. 1A-1D, a non-limiting example of motion interrupting water saving faucet valve (water saving valve 100) in a basic embodiment is shown. These four figures are intended to illustrate the basics behind the operation of water saving valve 100. Water saving valve 100 is made up of a few critical components, namely actuator element 23, valve body 24, and a motion interrupter, raised lip 5. Valve body 24 in this example is made up of cold-water inlet 102, hot water inlet 104, and outlet 106.

Figure 1A:
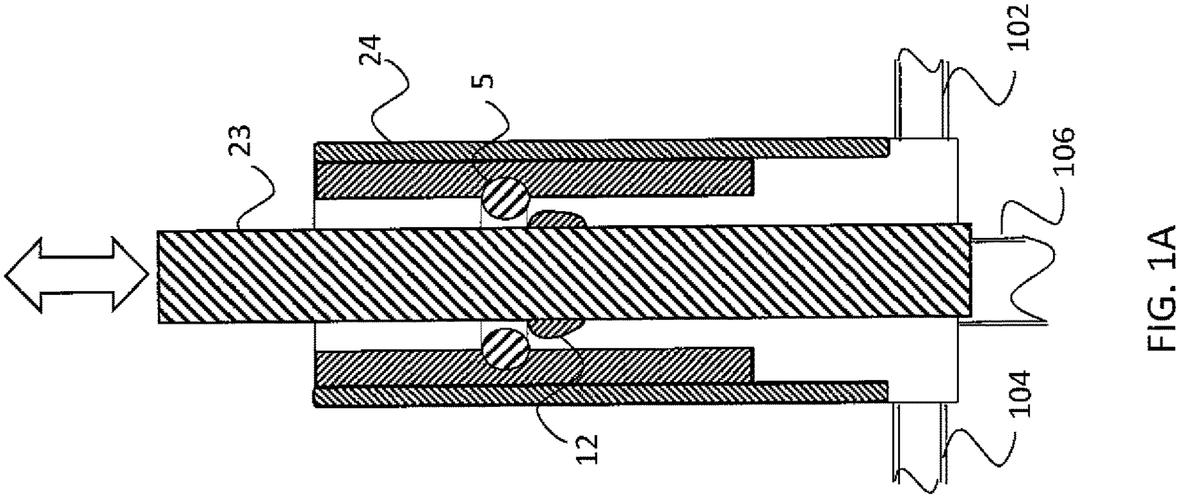

In FIG. 1A, hot and cold water are both able to flow into valve body 24 via their respective inlets, but the resulting mixture cannot exit outlet 106 because actuator element 23 is in the closed position; sealing outlet 106. Actuator element 23 is in this position because the faucet is in the off position. FIG. 1B shows the faucet opened to a predetermined position, but the movement is halted once speedbump 12, that is located on actuator element 23, is impeded by raised lip 5. Raised lip 5 stops a user from moving a faucet to the fully open position, so while actuator element 23 is no longer sealing outlet 106, the water flow through outlet 106 is significantly impeded such that a lower flow rate occurs at the faucet opening. Here, motion is completely halted, but it is fully envisioned that other embodiments can include only momentarily slowing of actuator 23.

Figure 1D:
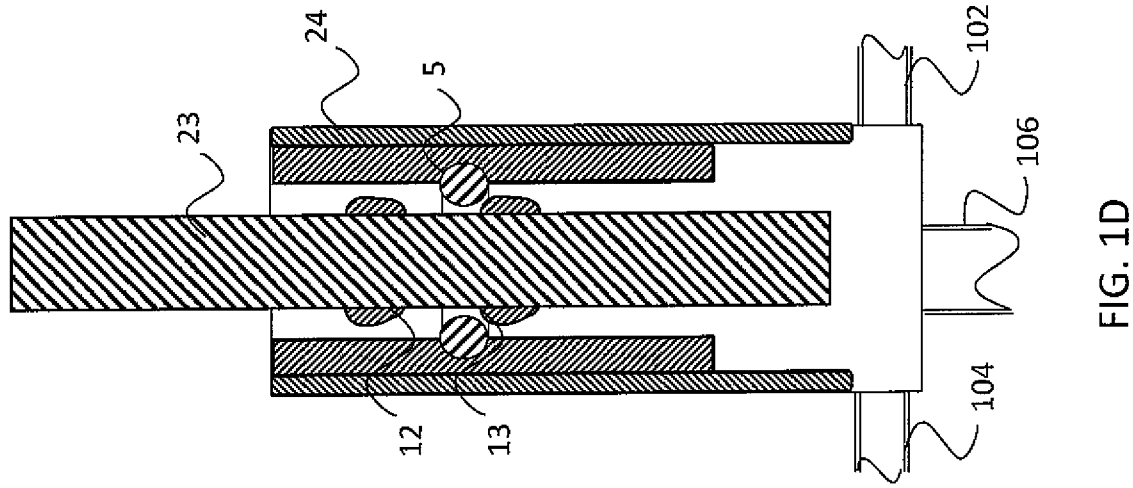
Figure 1C:
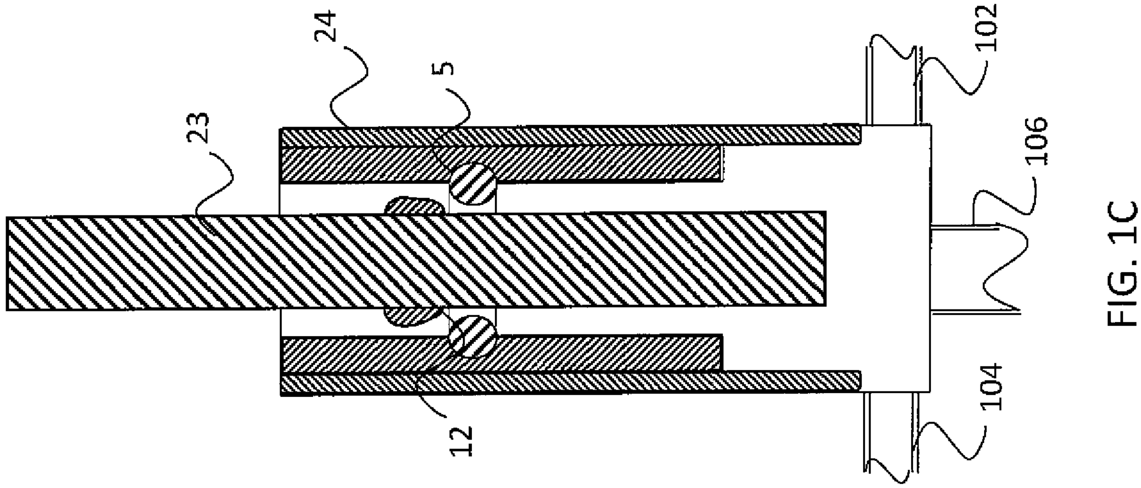

FIG. 1C shows a faucet in the fully open position should a user desire the full flow rate that a faucet is capable of. To get to this point, a user just simply opens the faucet to the fully open position by applying enough force for speedbump 12 to overcome the compressive force delivered by raised lip 5. Raised lip 5 was designed such that it does not require a tremendous amount of force to overcome, thus making use of water saving valve 100 widely accessible.

Referring now to FIG. 1D, actuator element 23 has a second speedbump 13 located on it some distance below speedbump 12. In this alternative embodiment there are now two different points of feedback for a user when using water saving valve 100. This will give a user even more flow rates to select from when they do not need the maximum flow rate. Additionally, it is important to note that in any of the disclosed embodiments the interrupting mechanism and feedback mechanism can be located anywhere in water saving valve 100. In a nonlimiting example for the feedback mechanism, second speedbump 13 was located at some distance below speedbump 12, but it could easily have been located closer or farther away from speedbump 12. However, in a nonlimiting example for the interrupting mechanism, raised lip 5 could be located anywhere higher up the interior of valve body 24 or lower.

Figure 2:
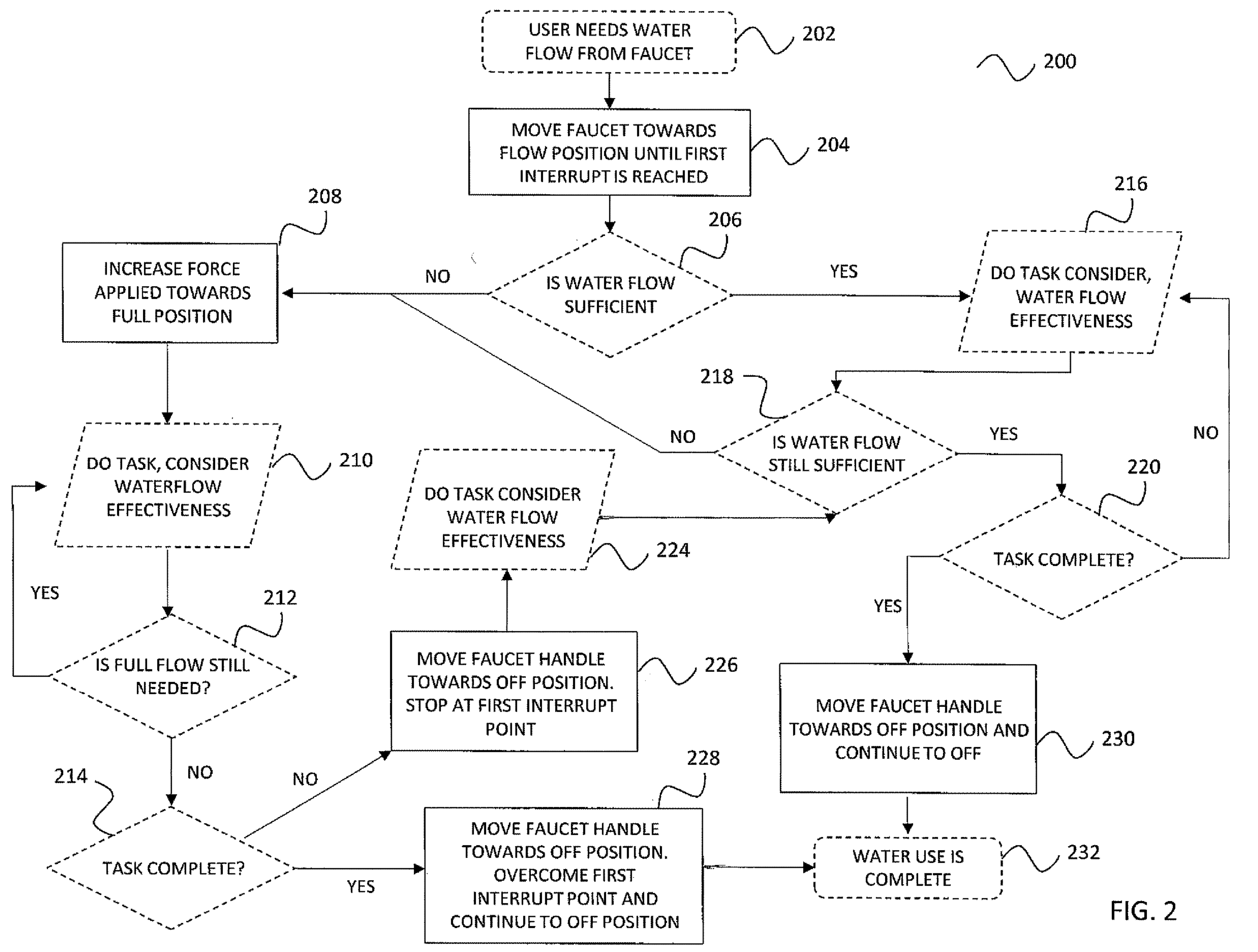
FIG. 2 is a user decision flow chart for a user of the motion interrupting water saving faucet valve.

Referring now to FIG. 2, a user decision flow chart for operation of the present invention is shown and generally designated as process 200. The process begins at step 202 when a user needs water flow from a faucet, and immediately proceeds to step 204 by opening the faucet until a first interrupt is reached. Step 206 is the first decision a user will need to make. If the water flow is sufficient, then a user proceeds to step 216 where the task is performed and the water flow effectiveness is considered. If the water flow is not sufficient, the user goes to step 208 and increases the force applied to the faucet until it reaches the full flow position.

For sake of discussion, it is assumed that the decision made after step 206 was no, and a user is now at step 208. At step 208 a user will increase the force applied to a faucet until it is in the fully open position. Once that is done, a user will then proceed to step 210 and consider the effectiveness of the water flow. At step 212, a user then considers whether the full flow is still needed, if that is a yes then the user will loop back to step 210 and reconsider the water flow effectiveness. If it is a no, a user then proceeds to step 214 to ask whether the task has been completed. If it is instead a yes, then a user moves to step 228 and starts to close the faucet and overcomes the first interrupt once it is encountered so that the faucet can be closed at step 232.

However, if a user at step 214 has not completed their task, but no longer needs the faucet fully open, then they can move to step 226 and turn the faucet handle to the off position until the first interrupt point is encountered. This will greatly reduce the water flow of the faucet, but still provide the user with the water flow they need for a task. While at the first interrupt point, a user will once again evaluate the water flow effectiveness at step 224 prior to determining whether the water flow is still sufficient at step 218. If the water flow is sufficient then a user will evaluate whether the task is complete at step 220. If the is complete, then a user will move the faucet handle to the off position at step 230 in order to complete their water use at step 232. However, if the water flow is not sufficient at step 218, then a user will loop back to step 208 and increase the force applied to the faucet so it is in the fully open position.

Reverting back to the first decision at step 206, the water flow is actually sufficient. When this is the case, a user will proceed to step 216 and consider the water flow effectiveness prior to asking whether the water flow is sufficient at step 218. If the flow is sufficient, then a user will then proceed to step 220 to ask themselves whether the task is complete, if it is not then the user will loop back to step 216. However, if the task is complete, user will follow steps 230 and 232 to close the faucet and complete their water use. However, if the water flow is not sufficient at step 218, then a user can go to step 208 and increase the force applied towards the faucet and fully open it.

Figure 3B:
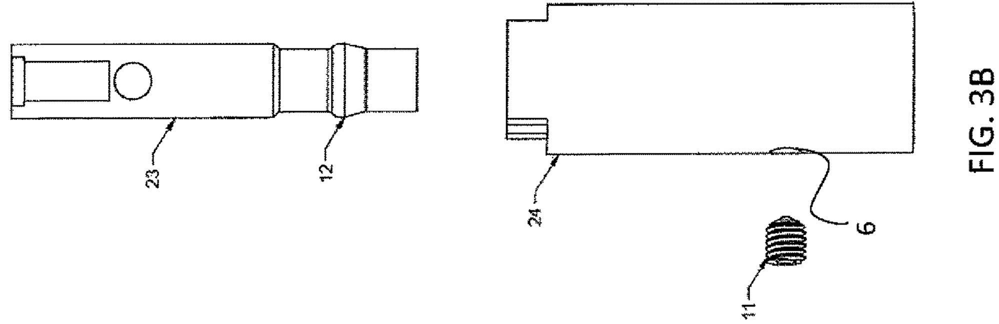
FIG. 3B is a section view providing a close-up view of the water saving faucet valve and the valve body.
Figure 3A:
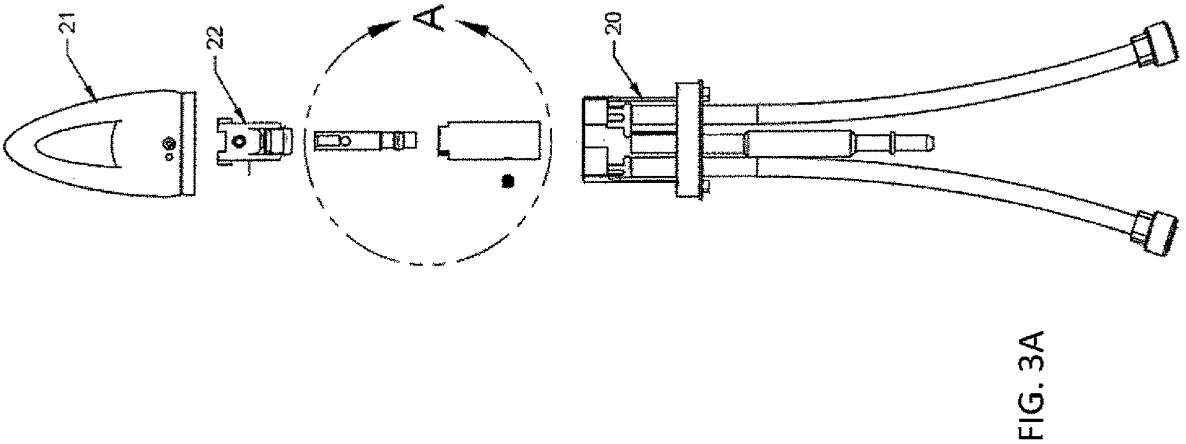
FIG. 3A is a front view of the motion interrupting water saving faucet valve in use within a lever actuated faucet.

Referring now FIGS. 3A an 3B, an exploded view of a preferred embodiment of water saving valve 100 that is installed inside a lever faucet system is shown. In this embodiment mixing valve faucet 20 is coupled to the bottom of valve body 24, and the top of actuator mechanism 23 is coupled to actuator handle 21 through linkage 22. A close-up view of valve body 24 and actuator mechanism 23 can be seen in FIG. 3B. This view shows speedbump 12, which is a part of actuator mechanism 23, and positioned such that the opening of actuator handle 21 is halted when it hits screw-in interrupting mechanism 11, which screws into corresponding threaded aperture 6.

To use this embodiment, the user begins by moving attached actuator handle 21 to the open position, placing actuator element 23 in motion. As actuator element 23 passes a predetermined point (or points) of travel within valve body 24, its motion is interrupted by screw-in interrupting mechanism 11 and corresponding speedbump 12 (otherwise known as the feedback point). This halting of motion prompts a user to decide whether the water flow is sufficient for the task at hand. If the user prefers more water flow, they apply more force to actuator handle 21 towards the open position until the resistance generated by screw-in interrupting mechanism 11 is overcome and actuator element 23 motion resumes, allowing more water flow. If, however, the user is satisfied with the water flow, they stop applying force to actuator handle 21, and the faucet remains in water-saving mode. If the user is in water-saving mode and then decides they require higher water flow, they apply additional pressure to actuator handle 21 towards the open position until the resistance generated by the screw-in interrupting mechanism 11 overcome and the actuator element 23 motion resumes, allowing a higher volume of water flow.

Alternatively, if the user initially needed more water flow, but then subsequently determines that they now want a lower flow of water, they can get the lower flow rate by closing the actuator element 23 by moving actuator handle 21 towards the closed position until the motion is again interrupted by screw-in interrupting mechanism 11. When they wish to end water flow, they apply force to the actuator handle 21 causing the attached actuator element 23 to overcome the resistance generated by screw-in interrupting mechanism 11 and move towards the closed position until it reaches the fully closed position.

This embodiment of water saving valve 100 can easily be installed onto existing lever style faucet systems. All a user needs to do is disassemble an existing faucet, place valve body 24 inside mixing valve 20 and connect the actuator mechanism 23 to actuator handle 21 prior to reassembling the entire faucet system. This is an incredibly cost-effective way to reduce water consumption, while still preserving the ability to achieve the full flow rate of the lever faucet system. Additionally, the amount of force generated by screw-in interrupting mechanism 11 can be adjusted to provide more or less force by simply turning screw-in interrupting mechanism 11 in the corresponding direction.

Figure 4:
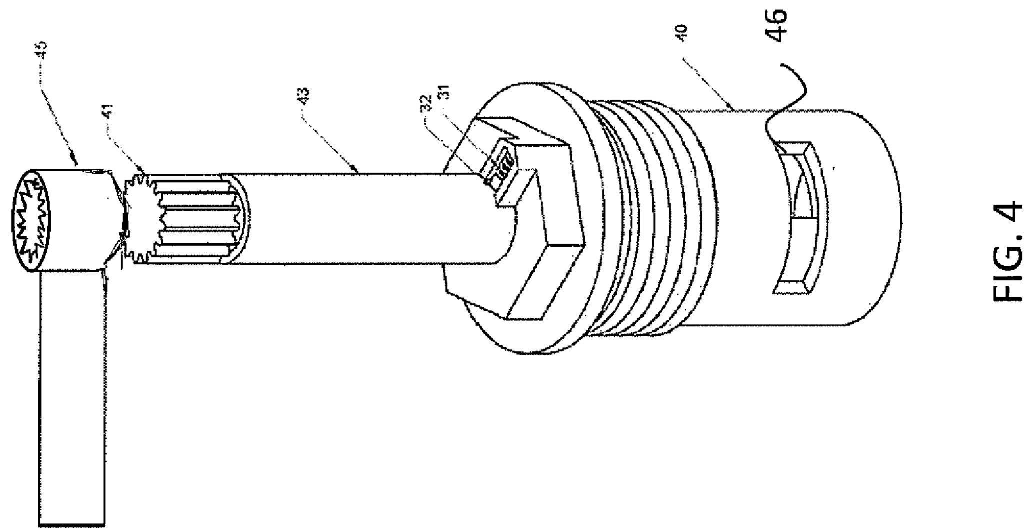
FIG. 4 is a quarter turn faucet with a motion interrupting water saving faucet valve installed.

Referring now to FIG. 4, a top perspective view of an alternative embodiment of the present invention is shown. More specifically, water saving valve 100 is part of a new design for a conventional quarter turn style faucet. This embodiment has conventional handgrip 45 mated to splined handgrip interface 41 which is the end point of rotating cartridge valve stem 43. The unique feature of this embodiment is the use of a ball and spring detent system to reduce the fluid flow. Additionally, another unique feature of this embodiment is that the amount of feedback provided by the ball-and-spring 31 can be increased or lowered through the use of a spring with a higher or lower stiffness.

Figure 6:
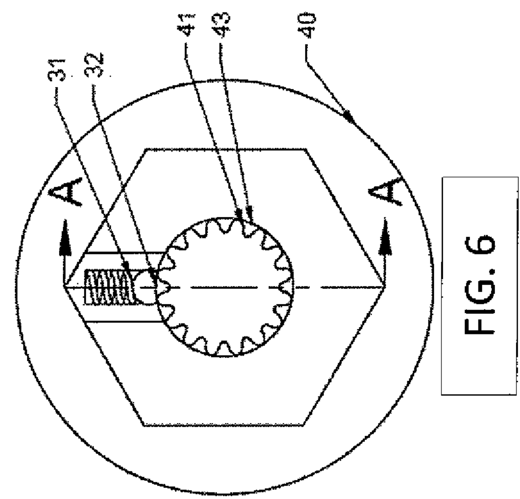
FIG. 6 is a top view of a quarter turn faucet with a motion interrupting water saving faucet valve.
Figure 5:
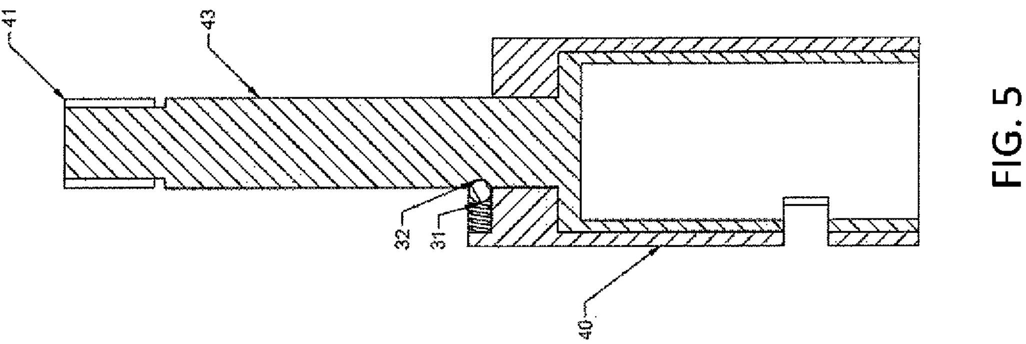
FIG. 5 is a section view of a quarter turn faucet with a motion interrupting water saving faucet valve.

This can be better illustrated when discussing the section view displayed in FIG. 5 and the top view displayed in FIG. 6. In this view ball-and-spring 31 is fully engaged inside depression 32. As a user begins to rotate the cartridge valve 43 towards the open position by turning conventional handgrip 45 so that faucet aperture 46 of faucet 40 will start to open. Once faucet aperture 46 is opened a predetermined amount, cartridge valve 43 will be at a position such that ball-and-spring 31 is fully engaged inside depression 32. If a user desires more flow, then the engagement of ball-and-spring 31 and depression 32 can easily be overcome by applying more rotational force to conventional handgrip 45.

Alternatively, if the user is satisfied with the water flow, they stop rotating the cartridge valve 43 by ceasing rotational pressure on conventional handgrip 45 and the faucet remains in water-saving mode. If the user is in water-saving mode and then decides they require higher water flow, they apply rotational force to the cartridge valve 43 using conventional handgrip 45 towards the open position until the resistance generated by the ball-and-spring 31 and corresponding depression 32 is overcome and the cartridge valve 43 rotation resumes, allowing a higher volume of water to flow.

In another scenario where the user has initially chosen more water flow, but then determines they want a lower flow of water, they would begin closing the cartridge valve 43 by turning conventional handgrip 45 towards the off position until the rotation is again interrupted by the ball-and-spring 31 and corresponding depression 32, easily allowing them to adjust to a lower water flow. When they wish to end water flow, they apply rotational force to the cartridge valve 43 using the attached handgrip 45 towards the closed position until it is fully seated in the closed position.

While there have been two embodiments disclosed in the present application for water saving valve 100, there are a number of alternative embodiments that can incorporate the use of water saving valve 100.

For example, there are many styles of detent mechanisms other than the ones disclosed that could be used and implemented. Examples (not limited to): Wedge and notch, O-ring and groove, Garter spring and groove, cam and lobe, linkages. Additionally, there are also alternative methods to interrupt the travel instead of using the mechanical methods disclosed. This includes the use of electro-mechanical forces, magnetic forces, fluidic forces, and/or a dashpot system.

The travel of the actuator could be designed to be bistable.

The feedback along the actuator travel could be incorporated into the actuator handle assembly or the internal walls of the cartridge.

There are multiple ways to manufacture the feedback into the facet and/or cartridge, including but not limited to: threading, welding, casting, bonding, pressing, brazing, and others.

The reduced water flow point(s) could be incorporated into touchless actuator faucets.

We claim:

1. A motion interrupting water saving faucet valve comprising:

a hollow valve body having a top with an aperture and a bottom with a water outlet;

a screw-in interrupting mechanism installed within an interior of the valve body at some distance above the water outlet;

an actuator mechanism within the valve body interior, having a proximal end that extends out of the aperture and a distal end that seals the water outlet;

an asymmetrical speedbump installed onto a surface of the actuator mechanism; and a linkage that connects the proximal end of the actuator mechanism to a faucet handle, such that the faucet handle controls the movement of the actuator mechanism in an opening direction and a closing direction, wherein the asymmetrical speedbump is placed to engage the screw-in interrupting mechanism, providing a first tactile feedback with a first biasing force in the opening direction, and a second tactile feedback with a second biasing force in the closing direction; wherein said first biasing force is greater than said second biasing force.

2. The motion interrupting water saving faucet valve of claim 1, wherein said screw-in interrupting mechanism is formed with threads and is threadably engageable into a threaded aperture formed in the valve body, and wherein said first tactile feedback provided by said interrupting mechanism is adjustable by threading said screw-in interrupting mechanism into said valve body.

3. The motion interrupting water saving faucet valve of claim 1, wherein said speedbump is formed with an abrupt protruding bump to provide a first tactile feedback to the user when moving in the opening direction, and an opposing gradual ramp to provide a second tactile feedback when moving in the closing direction.

4. The motion interrupting water saving faucet valve of claim 1, further comprising a second asymmetrical speedbump installed onto a surface of the actuator mechanism.

5. The motion interrupting water saving faucet valve of claim 4, wherein the second asymmetrical speedbump is placed to engage the screw-in interrupting mechanism, providing a third tactile feedback with a third first biasing force in the opening direction, and a fourth tactile feedback with a fourth biasing force in the closing direction; wherein said third biasing force is greater than said fourth biasing force.

6. The motion interrupting water saving faucet valve of claim 1, wherein said third biasing force is greater than said first biasing force to require greater force to open said valve past said second asymmetrical speedbump than said first asymmetrical speedbump.

7. The motion interrupting water saving faucet valve of claim 1, further comprising a second screw-in interrupting mechanism installed within the valve body interior at some distance above the first screw-in interrupting mechanism and positioned to engage said asymmetrical speedbump.

8. The motion interrupting water saving faucet valve of claim 7, wherein said screw-in interrupting mechanism is formed with threads and is threadably engaged into a threaded aperture formed in the valve body at some distance above the water outlet;

wherein said second screw-in interrupting mechanism is formed with threads and is threadably engaged into a second threaded aperture formed in the valve body at some distance above said threaded aperture;

wherein said screw-in interrupting mechanism is threaded into said valve body a first distance, and said second screw-in interrupting mechanism is threaded into said valve body a second distance;

wherein said first distance and said second distance differ; and wherein during operation of said valve, said screw-in interrupting mechanism contacts said speedbump with a first biasing force, and said second screw-in interrupting mechanism contacts said speedbump with a second biasing force.

9. The motion interrupting water saving faucet valve of claim 8, wherein said first biasing force and said second biasing force differ.

10. The motion interrupting water saving faucet valve of claim 1, wherein said screw-in interrupting mechanism is formed with threads and is threadably engaged into a threaded aperture formed in the valve body; and wherein said screw-in interrupting mechanism further comprises a spring adjacent a ball extending from said screw-in interrupting mechanism to contact said speedbump when said actuator mechanism is moved in an opening direction and a closing direction.

11. The motion interrupting water saving faucet valve of claim 1, wherein said asymmetrical speedbump is formed circumferentially around said actuator mechanism.

12. A motion interrupting water saving faucet valve comprising:

a hollow valve body having a top with an aperture and a bottom with a water outlet;

a detent mechanism installed within an interior of the valve body at some distance above the water outlet;

a removable actuator mechanism positionable within the valve body interior, having a proximal end that extends out of the aperture and a distal end that seals the water outlet;

an asymmetrical speedbump installed onto a surface of the actuator mechanism; and a linkage that connects the proximal end of the actuator mechanism to a faucet handle, such that the faucet handle controls the movement of the actuator mechanism in an opening direction and a closing direction, wherein the asymmetrical speedbump is placed to engage the detent mechanism, providing a first tactile feedback with a first biasing force in the opening direction, and a second tactile feedback with a second biasing force in the closing direction; wherein said first biasing force is greater than said second biasing force.

13. The motion interrupting water saving faucet valve of claim 12 wherein said detent mechanism comprises an elastomer ring positioned within said valve body.

14. The motion interrupting water saving faucet valve of claim 13 wherein said detent mechanism is formed to contact said asymmetrical speedbump when said actuator mechanism translates within said valve body.

* * * * *